United States Patent

Fauni

(10) Patent No.: US 6,886,800 B2
(45) Date of Patent: May 3, 2005

(54) PRODUCTION METHOD FOR THE ROTOR COMPONENT OF A POSITION SENSOR OF A BUTTERFLY VALVE FOR AN INTERNAL COMBUSTION ENGINE

(75) Inventor: Claudio Fauni, Bologna (IT)

(73) Assignee: Magneti Marelli Powertrain S.p.A., Viale Aldo Borletti (IT)

( * ) Notice: Subject to any disclaimer, the term of this patent is extended or adjusted under 35 U.S.C. 154(b) by 0 days.

(21) Appl. No.: 10/657,704

(22) Filed: Sep. 9, 2003

(65) Prior Publication Data

US 2004/0108483 A1 Jun. 10, 2004

(30) Foreign Application Priority Data

Sep. 10, 2002 (IT) .................................... BO2002A0571

(51) Int. Cl.⁷ ............................ F16K 31/02; F16K 1/22; E04B 1/16
(52) U.S. Cl. .................. 251/129.11; 251/305; 251/308; 264/35
(58) Field of Search ...................... 251/129.11, 129.12, 251/129.13, 129.01, 305, 308; 123/399; 137/554; 264/35

(56) References Cited

U.S. PATENT DOCUMENTS 3,804,366 A * 4/1974 Rubright ..................... 251/305
6,354,267 B1   3/2002 Kotchi et al.
6,407,543 B1 * 6/2002 Hagio et al. ........... 324/207.25
2004/0031945 A1 * 2/2004 Krimmer et al.

FOREIGN PATENT DOCUMENTS

| DE | 195 25 510 | 1/1997 |
|---|---|---|
| DE | 195 40 323 | 4/1997 |
| EP | 1 028 239 | 8/2000 |

* cited by examiner

*Primary Examiner*—David J. Walczak
(74) *Attorney, Agent, or Firm*—Blank Rome LLP

(57) ABSTRACT

A production method for a butterfly valve which comprises a valve seat engaged by a butterfly body keyed on a shaft in order to rotate under the action of an electric actuator coupled to this shaft by means of a geared transmission which ends in a final gear keyed on this shaft, the shaft being coupled to a position sensor provided with a rotor rigid with the shaft and a stator disposed to face the rotor, this method comprising the stages of disposing the shaft and the rotor of the position sensor in a mould, injecting plastic material into this mould in order to fill the mould and producing, by moulding, the butterfly body keyed on the shaft and the final gear keyed on the shaft and incorporating the rotor of the position sensor.

9 Claims, 3 Drawing Sheets

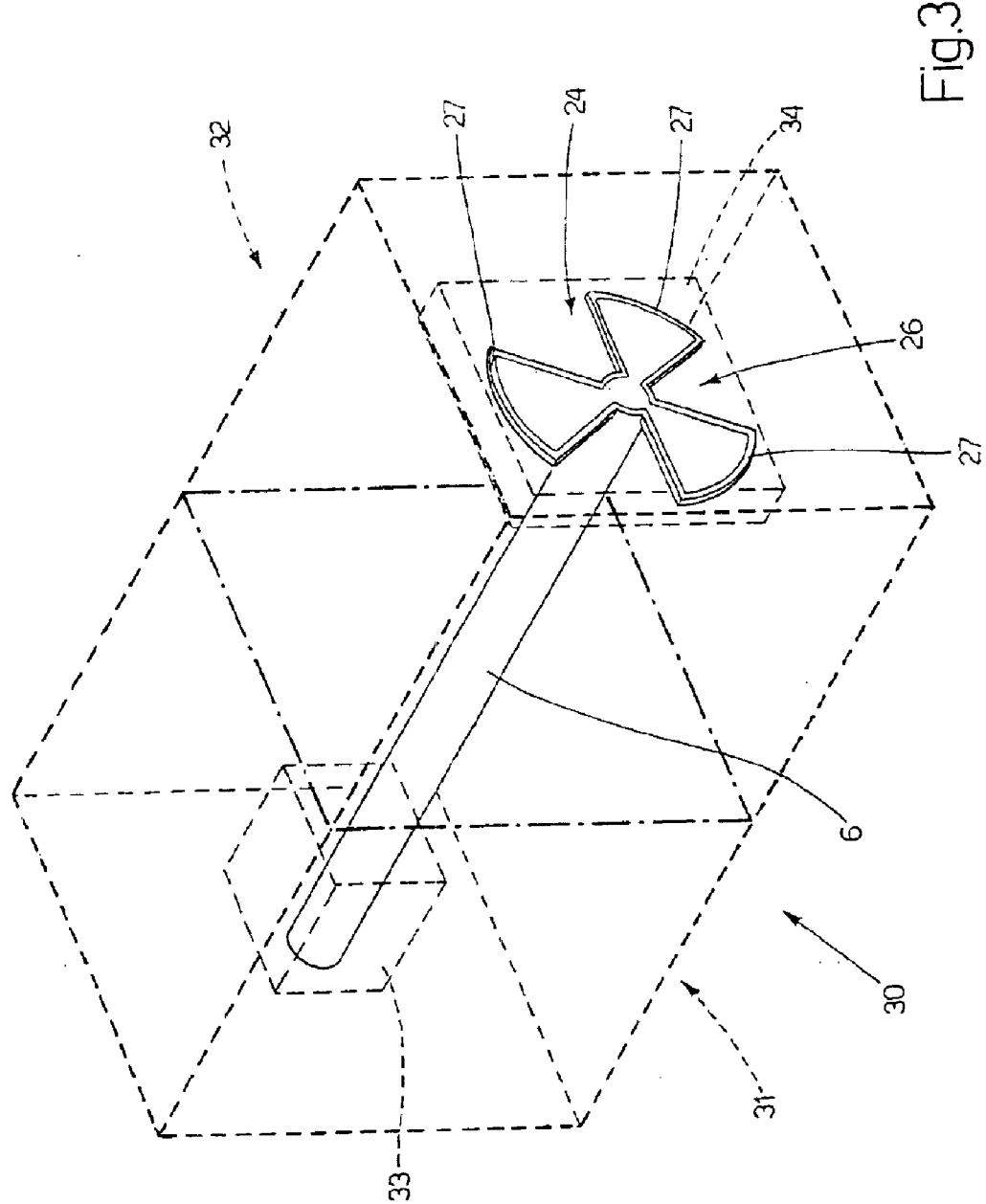

PRODUCTION METHOD FOR THE ROTOR COMPONENT OF A POSITION SENSOR OF A BUTTERFLY VALVE FOR AN INTERNAL COMBUSTION ENGINE

The present invention relates to a method for the production of a butterfly valve for an internal combustion engine.

BACKGROUND OF THE INVENTION

Internal combustion engines supplied with petrol are conventionally provided with a butterfly valve which regulates the flow of air supplied to the cylinders. Typically, the butterfly valve has a valve body housing a valve seat engaged by a butterfly body which is keyed on a shaft in order to rotate between an open position and a closed position under the action of an electric actuator coupled to this shaft by means of a geared transmission. The shaft bearing the butterfly valve is associated with a position sensor, typically an angular encoder, adapted to detect the angular position of the shaft and therefore of the butterfly valve, in order to enable a control unit to control, in feedback, the electric actuator which determines the position of the butterfly valve; the position sensor in particular comprises a rotor which is coupled to the shaft and to a stator and which, in use, faces the stator and is adapted to detect the angular position of this stator.

At present the rotor of the position sensor is secured to the shaft of the butterfly valve after the production of this shaft typically by gluing; however, this working method is relatively complex and costly.

SUMMARY OF THE INVENTION

The object of the present invention is to provide a method for the production of a butterfly valve for an internal combustion engine which is free from the drawbacks described above and is, in particular, easy and economic to embody.

The present invention therefore relates to a method for the production of a butterfly valve for an internal combustion engine as set out in claim 1.

The present invention also relates to a butterfly valve for an internal combustion engine as set out in claim 6.

BRIEF DESCRIPTION OF THE DRAWINGS

The present invention will be described with reference to the accompanying drawings, which show a non-limiting embodiment thereof, and in which:

FIG. 3 is a perspective, diagrammatic view of a stage of production of the shaft of FIG. 2.

DETAILED DESCRIPTION OF THE INVENTION

Figure 1:
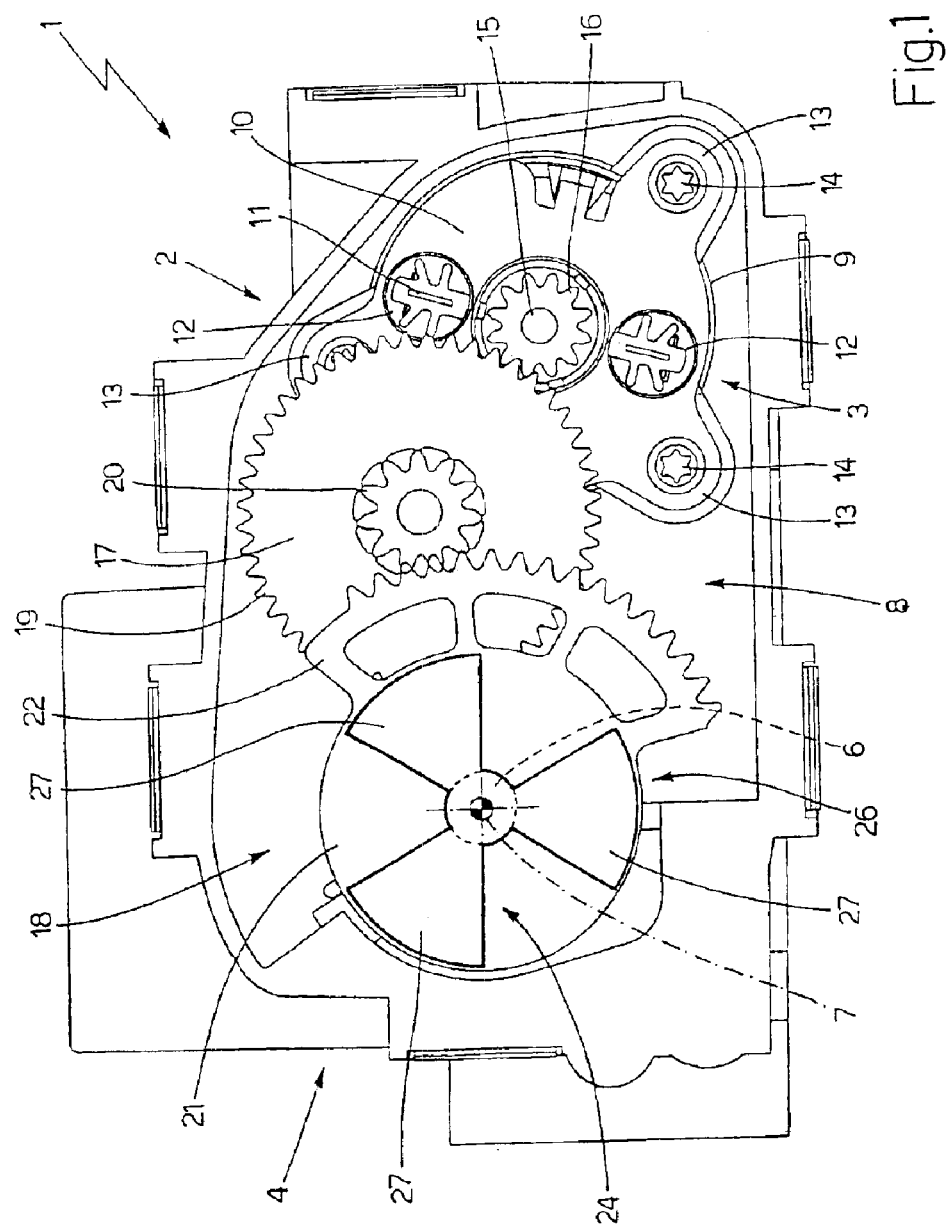
FIG. 1 is a front, diagrammatic view, with parts removed for clarity, of a butterfly valve for an internal combustion engine produced according to the method of the present invention.

In FIG. 1, a butterfly valve for an internal combustion engine (not shown) is shown overall by 1. The butterfly valve 1 comprises a valve body 2 housing an electric actuator 3, a valve seat 4 and a butterfly body 5 (shown in FIG. 2), which engages the valve seat 4 and may move between an open position and a closed position under the action of the electric actuator 3. The butterfly body 5 is in particular keyed on a metal shaft 6 having a longitudinal axis 7 in order to rotate between the open position and the closed position under the action of the electric actuator 3 coupled to the shaft 6 by means of a geared transmission 8.

The electric actuator 3 has a cylindrical body 9 which is bounded, at the location of its base, by a metal plate 10 provided with a pair of through holes (not shown) via which two electrical conductors 11 pass; these conductors supply electrical energy to the electric actuator 3. A respective insulating bushing 12 is interposed between each electrical conductor 11 and the respective hole (not shown) of the plate 10. The main function of the plate 10 is to enable the electric actuator 3 to be secured to the valve body 2; for this purpose, the plate 10 has three radial drilled projections 13, via which respective screws 14 for fastening to the valve body 2 are inserted.

The electric actuator 3 has a shaft 15 ending in a toothed wheel 16 which is mechanically connected to the shaft 6 by means of a idle toothed wheel 17 interposed between the toothed wheel 16 and a final gear 18 keyed on the shaft 6. The toothed wheel 17 has a first set of teeth 19 coupled to the toothed wheel 16 and a second set of teeth 20 coupled to the final gear 18; the diameter of the first set of teeth 19 differs from the diameter of the second set of the teeth 20 with the result that the toothed wheel 17 determines a non-unitary transmission ratio. The final gear 18 is formed by a solid, central, cylindrical body 21 keyed on the shaft 6 and provided with a circular crown portion 22 provided with a set of teeth coupled to the toothed wheel 17. The whole of the geared transmission 8, i.e. the toothed wheel 16, the toothed wheel 17 and the final gear 18 are normally made from plastic material.

Figure 2:
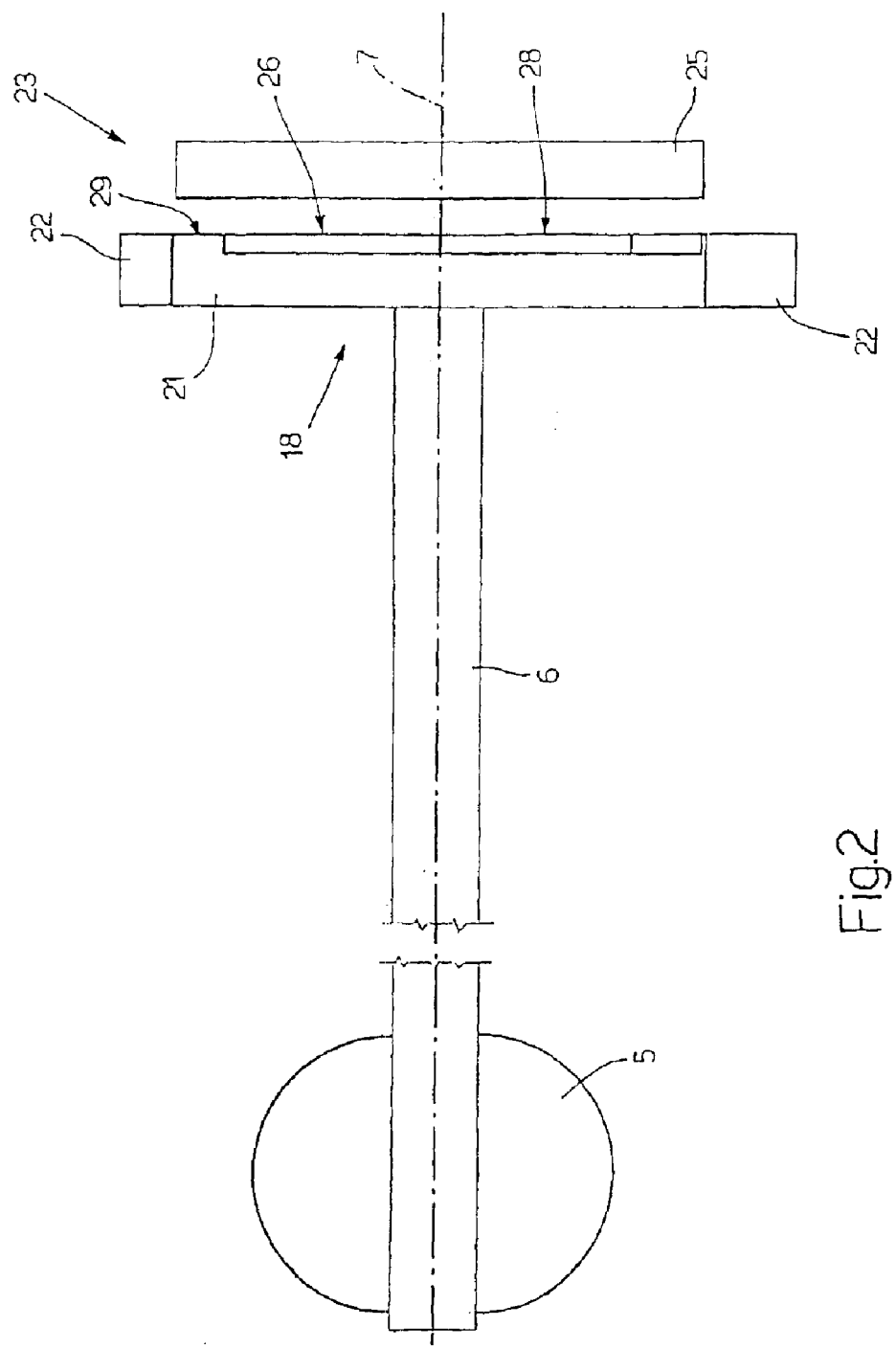
FIG. 2 is a lateral, diagrammatic view of a shaft of FIG. 1.

As shown in FIGS. 1 and 2, the butterfly valve 1 comprises a position sensor 23 which is coupled to the shaft 6 and is adapted to detect the angular position of the butterfly body 5. The position sensor 23 comprises a rotor 24 rigid with the shaft 6 and a stator 25 disposed to face the rotor 24; the rotor 24 is defined by a plane metal coil 26, which is closed in short-circuit, has a set of lobes 27 and is incorporated in the central cylindrical body 21 of the final gear 18.

As shown in the accompanying drawings, the metal coil 26 is partially embedded in the central cylindrical body 21 of the final gear 18 so that a surface 28 of the coil 26 facing the stator 25 is substantially coplanar with an outer surface 29 of the cylindrical body 21. According to a different embodiment (not shown), the metal coil 26 is completely embedded in the central cylindrical body 21 of the final gear 18.

As shown in FIG. 3, during the production of the butterfly valve 1, the shaft 6 and the rotor 24 of the position sensor 23 coaxial with the shaft 6 are disposed in a mould 30, plastic material is then injected into the mould 30 so as to fill this mould 30 and produce, by moulding, the butterfly body 5 keyed on the shaft 6 and the final gear 18 keyed on the shaft 6 and incorporating the rotor 24 of the position sensor 23.

The mould 30 comprises two portions 31 and 32 that can be separated; the separable portion 31 of the mould 30 houses part of the shaft 6 and has a respective hollow portion 33 for the production of the butterfly body 5 and the separable portion 32 of the mould 30 houses the remaining part of the shaft 6 and has a respective hollow portion 34 which is adapted to produce the final gear 18 and to bear the rotor 24 of the position sensor 23. The hollow portions 33 and 34 are not shown in detail as they are substantially known and have a shape that negatively reproduces the respective shapes of the butterfly body 5 and the final gear 18.

The method of production described above is particularly advantageous as it makes it possible to contain production times and costs and, at the same time, makes it possible to obtain considerable structural precision especially as regards the positioning of the rotor 24 with respect to the shaft 6.

What is claimed is:

1. A production method for a butterfly valve (1) for an internal combustion engine, this butterfly valve (1) comprising a valve seat (4) engaged by a butterfly body (5) keyed on a shaft (6) in order to rotate between an open position and a closed position under the action of an electric actuator (3) coupled to this shaft (6) by means of a geared transmission (8) which ends in a final gear (18) keyed on the shaft (6), the shaft (6) being coupled to a position sensor (23) provided with a rotor (24) rigid with the shaft (6) and a stator (25) disposed to face the rotor (24), this method being characterised in that it comprises the stages of disposing the shaft (6) and the rotor (24) of the position sensor (23) coaxial with the shaft (6) in a mould (30), injecting plastic material into this mould (30) in order to fill the mould (30) and producing, by moulding, the butterfly body (5) keyed on the shaft (6) and the final gear (18) keyed on the shaft (6) and incorporating the rotor (24) of the position sensor (23).

2. A method as claimed in claim 1, in which the rotor (24) of the position sensor (23) comprises a plane metal coil (26) closed in short-circuit and having a series of lobes (27).

3. A method as claimed in claim 2, in which the metal coil (26) is partially embedded in the final gear (18), the metal coil (26) having a surface (28) facing the stator (25) of the position sensor (23), which surface (28) is substantially coplanar with an outer surface (29) of the final gear (18).

4. A method as claimed in claim 2, in which the metal coil (26) is completely embedded in the final gear (18).

5. A method as claimed in claim 1, in which the mould (30) comprises two portions (31, 32) which can be separated, a first separable portion (31) of the mould (30) housing part of the shaft (6) and having a respective hollow portion (33) for the production of the butterfly body (5) and a second separable portion (32) of the mould (30) housing the remaining part of the shaft (6) and having a respective hollow portion (34) which is adapted to produce the final gear (18) and to bear the rotor (24) of the position sensor (23).

6. A butterfly valve (1) for an internal combustion engine produced in accordance with the method as claimed in claim 1, this butterfly valve (1) comprising a valve seat (4) engaged by a butterfly body (5) keyed on a shaft (6) in order to rotate between an open position and a closed position under the action of an electric actuator (3) coupled to this shaft (6) by means of a geared transmission (8), which ends in a final gear (18) keyed on the shaft (6), the shaft (6) being coupled to a position sensor (23) provided with a rotor (24) rigid with the shaft (6) and a stator (25) disposed to face the rotor (24), the final gear (18) being produced by injection moulding of plastic material and incorporating the rotor (24) of the position sensor (23).

7. A valve (1) as claimed in claim 6, in which the rotor (24) of the position sensor (23) comprises a plane metal coil (26) closed in short-circuit and having a series of lobes (27).

8. A valve (1) as claimed in claim 7, in which the metal coil (26) is partially embedded in the final gear (18), the metal coil (26) having a surface (28) facing the stator (25) of the position sensor (23), which surface (28) is substantially coplanar with an outer surface (29) of the final gear (18).

9. A valve (1) as claimed in claim 7, in which the metal coil (26) is completely embedded in the final gear (18).

* * * * *